United States Patent [19]

Wakabayashi

[11] Patent Number: 4,571,044
[45] Date of Patent: Feb. 18, 1986

[54] FILM FEED CONTROL DEVICE IN A CAMERA

[75] Inventor: Hiroshi Wakabayashi, Yokohama, Japan

[73] Assignee: Nippon Kogaku K.K., Tokyo, Japan

[21] Appl. No.: 724,550

[22] Filed: Apr. 18, 1985

[30] Foreign Application Priority Data

Apr. 23, 1984 [JP] Japan .............................. 59-59595[U]

[51] Int. Cl.⁴ ................................................ G03B 1/18
[52] U.S. Cl. ................................................ 354/173.11
[58] Field of Search .................................... 354/173.11

[56] References Cited

U.S. PATENT DOCUMENTS 4,400,074  8/1983  Akiyama et al. ............... 354/173.11
4,460,256  7/1984  Araki et al. .................... 354/173.11
4,502,770  3/1985  Niwa et al. .................... 354/173.11

Primary Examiner—William B. Perkey
Attorney, Agent, or Firm—Fitzpatrick, Cella, Harper & Scinto

[57] ABSTRACT

A still camera provided with an electric motor for rotating a spool for taking up a roll film drawn out from a cartridge loaded into the camera comprises trigger means for starting the electric motor to start the rotation of the spool, means responsive to the movement of the roll film resulting from the rotation of the spool to generate a reset signal at a predetermined interval while the roll film is moved, means provided so as to be driven by the roll film and detecting that the movement of the roll film has been actually started and generating a detection signal, time counting means adapted to start time counting in synchronism with the trigger means and reset by the reset signal, the time counting means having a first delay time longer than the interval of the reset signal and a second delay time longer than the first delay time, the time counting means generating a time counting output after the lapse of the second delay time before the detection signal is generated, and generating a time counting output after the lapse of the first delay time after the detection signal has been generated, and means responsive to the time counting output to interrupt the operation of the electric motor for rotating the spool.

2 Claims, 3 Drawing Figures

FILM FEED CONTROL DEVICE IN A CAMERA

BACKGROUND OF THE INVENTION

1. Field of the Invention

This invention relates to a still camera provided with a film feeding device driven by an electric motor, and in particular to a device for controlling the feeding of a film.

2. Description of the Prior Art

Still cameras have become popular which are provided with an electric motor for driving a film feeding mechanism, whereby the operation of winding the leader portion of a roll film onto a take-up spool, the frame by frame wind-up operation after exposure and the operation of rewinding the film into a cartridge after termination of a rated number of exposures are automatic under the operative association with a photographing mechanism.

It is necessary to provide in such a still camera a countermeasure for immediately interrupting the power supply to the motor and thereby preventing the consumption of the battery when abnormality of the winding-up of the film occurs, for example, when the operation of an autoloading mechanism is incomplete and the leader portion of the loaded unexposed film fails to be wound on the spool and therefore the motor effects idle revolution or when the film reaches its limit of draw-out from the cartridge and therefore an overload occurs to stop the motor.

U.S. Pat. No. 4,400,074 discloses a device in which a switch is operatively associated with a free sprocket meshing with perforations and rotatable following the movement thereof so that each time one perforation is fed, the switch is changed over to reset a timer and if the time during which the free sprocket is not rotated exceeds the time required for one perforation to be fed, a time counting signal is put out from the timer to thereby cut off the power supply to the film winding-up motor. However, in the following case, a problem has occurred to this conventional device. That is, after a new film has been loaded into the camera, the motor is driven to wind the leader portion of the film on the spool. The film is moved only by the coupling of its leader portion to the spool with a result that the free sprocket is rotated. There is a time delay until this free sprocket is rotated. This is, for example, a case where the pawl of the spool does not immediately engage the perforation of the film but engages the perforation after the spool has made a certain degree of rotation or a case where the film is excessively drawn out from the cartridge and therefore the initial revolution of the motor is sent to eliminate the slack of this film. In such a case, a time counting signal has been put out from said timer before the film is fed and thus, the motor has been stopped without the film being fed.

SUMMARY OF THE INVENTION

It is an object of the present invention to provide a camera provided with an electrically driven film feeding device which eliminates wasteful consumption of electric power.

It is another object of the present invention to provide a control device provided with a timer which will not stop the motor even if there occurs a time delay during the time until the leader portion of a newly loaded film is coupled to the spool and the film is actually moved.

DESCRIPTION OF THE PREFERRED EMBODIMENT

Figure 1:
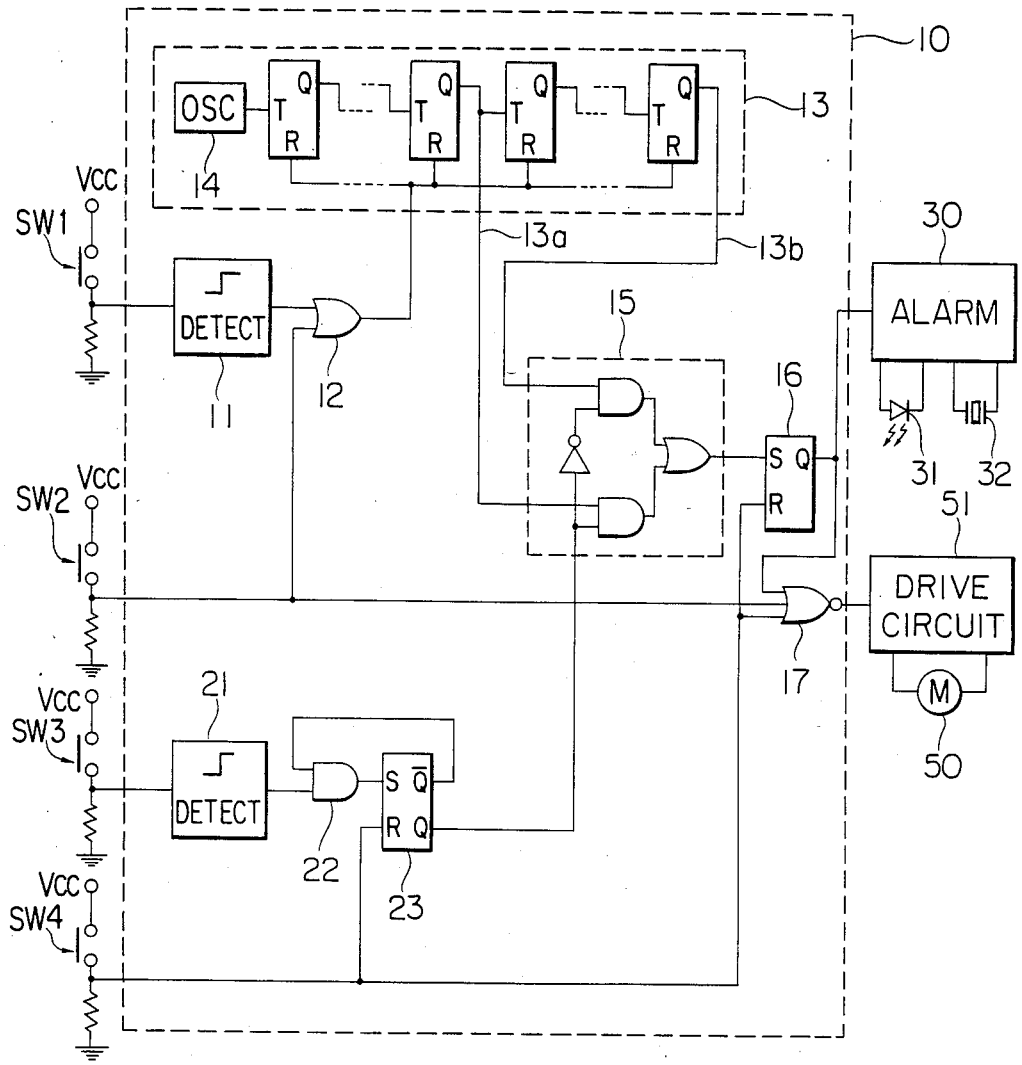
FIG. 1 shows a circuit diagram of the control device according to an embodiment of the present invention.

Referring to FIG. 1, there is shown an embodiment of a driving apparatus in a still camera provided with a film feeding mechanism using an electric motor. A drive motor 50 for rotating the film take-up spool of the camera, not shown, to feed a film by one frame during each exposure has its revolution controlled by a drive circuit 51 known from U.S. Pat. No. 4,319,171.

Figure 2:
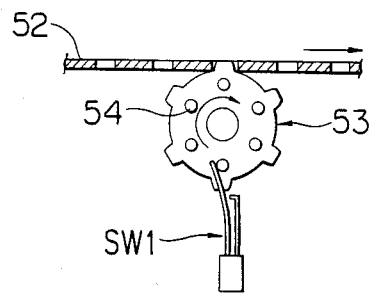
FIG. 2 is a plan view of a free sprocket.
Figure 3:
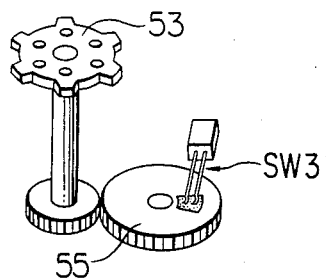
FIG. 3 is a perspective view of the free sprocket.

Switches SW1, SW2, SW3 and SW4 are provided between respective positive power source lines Vcc and grounded resistors. The switch SW1, as shown in FIG. 2, is engaged with one of six pins 54 provided on a free sprocket 53 which meshes with the perforations of a film 52 taken up by a take-up spool, and is adapted to be closed and opened each time a perforation is fed. The switch SW2 is a conventional timing switch operatively associated with a shutter device and a film wind-up device, and is adapted to be opened upon completion of the exposure by the shutter device and to be closed when the film is thereafter fed by one frame. The switch SW3, as shown in FIG. 3, is adapted to be closed while being in contact with a conductor portion on a gear 55 which makes one full rotation each time the free sprocket 53 makes 4/3 rotation, that is, the film is fed by one frame. The switch SW4, as is well known, is operatively associated with the back lid of the camera and is adapted to be closed when the back lid is open.

A control circuit 10 has four inputs and two outputs. The respective inputs are connected to the junctions between the switches SW1, SW2, SW3, SW4 and the grounded resistors. An alarm circuit 30 for driving a visual and acoustic alarm element is connected to one of the outputs, and the aforementioned motor drive circuit 51 is connected to the other output.

The input terminal of a detecting circuit 11 for detecting the rising of the input level and generating a positive pulse of a predetermined width is connected to the switch SW1, and the output terminal thereof is connected to one input terminal of an OR gate 12. The other input terminal of the OR gate 12 is connected to the switch SW2. The output terminal of the OR gate 12 is connected to the reset terminal of a time counting circuit 13. The time counting circuit 13 comprises an oscillator 14 and a multistage T-flip-flop. This time counting circuit 13 is provided with two output terminals 13a and 13b. The first output terminal 13a assumes H level when a first predetermined time elapses after the resetting of the time counting circuit has been released, and the second output terminal 13b assumes H level at a point of time whereat a second predetermined time longer than the first predetermined time has elapsed. In the present embodiment, the first predetermined time is set to a value slightly greater than the time required for the film to be fed by an amount corresponding to a perforation. These two output terminals 13a and 13b are connected to the two input terminals, respectively, of a multiplexer 15.

The input terminal of a detecting circuit 21 for detecting the rising of the input level and generating a positive pulse of a predetermined width is connected to the switch SW3, and the output terminal thereof is connected to one input terminal of an AND gate 22. The output terminal of the AND gate 22 is connected to the S input terminal of an RS flip-flop 23. The Q output terminal of the RS flip-flop 23 is connected to the control terminal of the multiplexer 15, and the reverse phase $\overline{Q}$ output terminal thereof is connected to the other input terminal of the AND gate 22. The R input terminal of the RS flip-flop 23 is connectd to the switch SW4.

The multiplexer 15 passes therethrough the output of the output terminal 13a of the time counting circuit when the input to the control terminal is at H level, and passes therethrough the output of the output terminal 13b of the time counting circuit when the input to the control terminal is at L level.

The output terminal of the multiplexer 15 is connected to the S input terminal of an RS flip-flop 16, and the R input terminal of this RS flip-flop 16 is connected to the switch SW4 and the Q output terminal thereof is connected to a first input of a NOR gate 17 and the alaram circuit 30. A second input of the NOR gate 17 is connected to the switch SW2, a third input thereof is connected to the switch SW4 and the output terminal thereof is connected to the motor drive circuit 51.

Description will now be made of the operations when film wind-up has been effected without hindrance in the present embodiment.

(i) First, when a back lid, not shown, is opened to load the camera with a film, the switch SW4 is closed and therefore, the flip-flops 16 and 23 are reset and the output of the NOR gate 17 assumes L level. Since the flip-flop 23 supplies the L level output to the control circuit of the multiplexer 15, the multiplexer becomes ready to pass therethrough the output of the output terminal 13b of the time counting circuit. Since the flip-flop 16 supplies the L level output to the alarm circuit 30, this circuit 30 has its operation inhibited. When the output of the NOR gate 17 assumes L level, the motor drive circuit 51 also has its operation inhibited.

(ii) When the camera is loaded with the film and the back lid is closed, the switch SW4 becomes open and the resetting of the flip-flops 16 and 23 is released.

(iii) When the shutter release button of the camera is depressed, the shutter operates. When the shutter closes the aperture for exposure, the switch SW2 changes over from its ON position to its OFF position and therefore, all of the three inputs of the NOR gate 17 assume L level and the output of the NOR gate 17 changes to H level, and the motor drive circuit 51 operates to start the motor 50 for the purpose of film wind-up.

With the opening of the switch SW2, the output of the OR gate 12 changes to L level and therefore, the resetting of the time counting circuit 13 is released and this circuit starts time counting.

(iv) When the film is positively wound on the spool by the operation of a conventional film loading device, not shown, and actually begins to be fed, the free sprocket 53 is rotated by the perforations. Each time one perforation is fed, the switch SW1 following the movement of the free sprocket momentarily assumes its ON position. The detecting circuit 11 detects the rising of the input level and supplies a positive pulse of a predetermined width to the OR gate 12. Along therewith, the time counting circuit 13 is reset. When the positive pulse of the detecting circuit 11 falls, the output of the OR gate 12 returns to L level and therefore, the time counting circuit again starts time counting. The resetting of this time counting circuit 13 is repeatedly effected each time one perforation is fed.

A time delay occurs during the time from the starting of the motor and the initiation of the time counting by the time counting circuit mentioned under item (iii) above until the film is wound on the spool and is actually fed, and when this delay time exceeds a first predetermined time, the output terminal 13a of the time counting circuit assumes H level. However, an L level signal is supplied from the Q output terminal of the flip-flop 23 to the control terminal of the multiplexer 15 until the film is fed by one frame and therefore, the time-up signal of this terminal 13a does not pass through the multiplexer. The motor is not stopped until a second predetermined time elapses and the output terminal 13b assumes H level.

(v) When the amount of feed of the film reaches an amount corresponding to one frame, i.e., an amount corresponding to eight perforations, the switch SW3 following the movement of the free sprocket 53 momentarily assumes its ON position. The detecting circuit 21 detects the rising of the input level and supplies a positive pulse of a predetermined width to one input terminal of the AND gate 22. Since the other input terminal of the AND gate 22 is initially at H level, the AND gate 22 supplies an H level output to the S input terminal of the flip-flop 23 and sets the flip-flop 23. Along therewith, the Q output terminal of the flip-flop 23 changes the control terminal of the multiplexer 15 from L level to H level and becomes ready to pass therethrough the output of the output terminal 13a of the time counting circuit. The $\overline{Q}$ output terminal of the flip-flop 23 supplies an L level ouput to the other input terminal of the AND gate 22 so that thereafter, the output of the detecting circuit 21 does not pass through the AND gate 22. Accordingly, the Q output terminal of the flip-flop 23 keeps H level unless the back lid of the camera is again opened.

Description will now be made of the operations when film loading has resulted in a failure and the film fails to be wound on the spool.

The first operation is the same as that described under items (i) to (iii) above.

If the film fails to be wound on the spool, the film is not fed and therefore, the free sprocket 53 is not rotated. Accordingly, the switch SW1 keeps its OFF or ON position and therefore, the time counting circuit 13 is not reset and thus, time counting continues. When a first predetermined time elapses from the initiation of time counting synchronized with the starting of the rotation of the motor, the output terminal 13a of the time counting circuit changes to H level. However, as previously described, the time counting signal of this output terminal 13a is prevented from passing through the multiplexer until the film is actually fed by one frame. When a further time elapses and a second predetermined time longer than the delay time from the starting of the motor until the film is actually fed is reached, the output terminal 13b of the time counting circuit changes to H level. This time counting signal passes through the multiplexer and sets the flip-flop 16. When the Q output terminal of the flip-flop 16 assumes H level, the alarm circuit 30 operates and a light-emitting diode 31 is turned on while, at the same time, a sound-producing element 32 begins to sound. Also, when the Q output terminal of the flip-flop 16 assumes H level, the output of the NOR gate 17 assumes L level and the motor 50 is stopped.

According to the present embodiment, as described above, even in a case where, in the operation of causing the leader portion of a film newly loaded into the camera to be wound on the spool, a time delay occurs from after the motor has been started until the leader portion of the film is acutally fed to rotate the free sprocket, the motor is not stopped until the relatively long second predetermined time elapses and therefore, the undesirable possibility of wind-up becoming impossible is reduced.

Description will now be made of the operations in a case where the photography of the rated exposure number in the film is terminated and the draw-out limit from the film cartridge is reached in the course of further winding up the film and the revolution of the motor becomes impossible.

The first operation is the same as that described under items (i) to (v) above.

When the film reaches its draw-out limit, the film is not fed in the course of wind-up and therefore, the free sprocket is stopped. Accordingly, the switch SW1 keeps its OFF or ON position and therefore, the time counting circuit is not reset but continues time counting. When the first predetermined time elapses from after the initiation of time counting synchronized with the revolution of the motor, the output terminal 13a of the time counting circuit changes to H level. By this time, an H level signal has already been supplied from the Q output terminal of the flip-flop 23 to the control terminal of the multiplexer. Accordingly, the time counting signal of this output terminal 13a passes through the multiplexer and sets the flip-flop 16. When the Q output terminal of the flip-flop 16 assumes H level, the alarm circuit 30 operates and the light-emitting diode 31 is turned on while, at the same time, the sound-producing element 32 produces a sound. Also, when the Q output terminal of the flip-flop 16 assumes H level, the output of the NOR gate 17 assumes L level and an L level output is supplied to the motor drive circuit 51. Thereby the motor is stopped.

The first predetermined time is set to a value slightly greater than the time required for the film to be fed by an amount corresponding to one perforation and therefore, the power supply time required when the motor has been stopped because the film has reached its draw-out limit may be shorter and thus, the consumption of the battery is greatly reduced.

Now, in the above-described embodiment, during the abnormality of wind-up, the power supply to the motor is cut off and an alarm to that effect is given, but even one of these can achieve the object of the present invention. That is, a construction may be adopted in which the photographer may operate some means in accordance only with an alarm to cut off the power supply as in the case where the power supply to the motor is automatically cut off.

In the above-described embodiment, the switch SW3 adapted to operate when the film has been fed by one frame is used to detect that the film has been actually fed, but alternatively, the detection of a smaller amount of feed of the film may be used for such purpose. For example, the flip-flop 23 may be operated in response to the closing of the switch SW1 adapted to operate when the film has been fed by an amount corresponding to one perforation.

I claim:
1. A still camera provided with an electric motor for rotating a spool for taking up a roll film drawn out from a cartridge loaded into the camera, comprising:
    (a) trigger means for starting said electric motor to start the rotation of said spool;
    (b) means responsive to the movement of said roll film resulting from the rotation of said spool to generate a reset signal at a predetermined interval while said roll film is moved;
    (c) means provided so as to be driven by said roll film and detecting that the movement of said roll film has been actually started and generating a detection signal;
    (d) time counting means adapted to start time counting in synchronism with said trigger means and reset by said reset signal, said time counting means having a first delay time longer than the interval of said reset signal and a second delay time longer than said first delay time, said time counting means generating a time counting output after the lapse of said second delay time before said detection signal is generated, and generating a time counting output after the lapse of said first delay time after said detection signal has been generated; and
    (e) means responsive to said time counting output to interrupt the operation of said electric motor for rotating said spool.

2. A still camera provided with an electric motor for rotating a spool for taking up a roll film drawn out from a cartridge loaded into the camera, comprising:
    (a) trigger means for starting said electric motor to start the rotation of said spool;
    (b) means responsive to the movement of said roll film resulting from the rotation of said spool to generate a reset signal at a predetermined interval while said roll film is moved;
    (c) means provided so as to be driven by said roll film and detecting that the movement of said roll film has been actually started and generating a detection signal;
    (d) time counting means adapted to start time counting in synchronism with said trigger means and reset by said reset signal, said time counting means having a first delay time longer than the interval of said reset signal and a second delay time longer than said first delay time, said time counting means generating a time counting output after the lapse of said second delay time before said detection signal is generated, and generating a time counting output after the lapse of said first delay time after said detection signal has been generated; and
    (e) alarm means energized in response to said time counting output.

* * * * *